United States Patent
Bonta et al.

(10) Patent No.: US 7,428,229 B2
(45) Date of Patent: Sep. 23, 2008

(54) AD HOC CLUSTER IDLE NODE COORDINATION

(75) Inventors: Jeffrey D. Bonta, Arlington Hts., IL (US); Thomas V. D'Amico, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 427 days.

(21) Appl. No.: 11/024,389

(22) Filed: Dec. 28, 2004

(65) Prior Publication Data
US 2006/0140135 A1    Jun. 29, 2006

(51) Int. Cl.
*H04Q 7/24* (2006.01)
(52) U.S. Cl. .................. 370/338; 370/311; 370/315; 370/252
(58) Field of Classification Search ............... 370/328, 370/338, 311, 238; 455/458, 574
See application file for complete search history.

(56) References Cited

U.S. PATENT DOCUMENTS 7,209,740 B2 *  4/2007  Bahl et al. ................. 455/434

2005/0122231 A1*  6/2005  Varaiya et al. ......... 340/870.01

OTHER PUBLICATIONS

Tijs Van Dam, et al., "An Adaptive Energy-Efficient MAC Protocol for Wireless Sensor Networks", Faculty of Information Technology and Systems Delft University Technology.

* cited by examiner

*Primary Examiner*—Charles N Appiah
*Assistant Examiner*—Amancio Gonzalez
(74) *Attorney, Agent, or Firm*—Charles W. Bethards

(57) ABSTRACT

Nodes (103*a-d*, 105, 107, 109*a-c*, 111*a-c*) in an ad hoc communication network are coordinated. The network includes the node (111*b*) and one or more neighbor nodes (103*a-d*, 105, 107, 109*a-c*, 111*a,c*). The node (111*b*) can sleep in a low duty cycle. Further, the node (111*b*) can awaken, responsive to a schedule; and register with a cluster head (101); listen for one or more neighbors, wherein the at least one neighbor can be active (103*a-d*, 105, 107) or idle (109*a-c*, 111*a,c*); and/or listen for one or more requests from the cluster head (101) or active neighbor(s) (103*a-d*, 105, 107). Responsive to the request(s), the idle node (111*b*) can become active on a communication link.

20 Claims, 5 Drawing Sheets

AD HOC CLUSTER IDLE NODE COORDINATION

FIELD OF THE INVENTION

The present invention relates in general to wireless networks and wireless communication devices, and more specifically to coordinating nodes in an ad hoc network.

BACKGROUND OF THE INVENTION

In an ad hoc network, no network infrastructure device is required, because nodes in the network can communication with each other via other nodes. The nodes of an ad hoc network typically are communication devices, some of which may be mobile, where the communication devices are equipped with a transmitter and receiver (collectively, a transceiver), connected to each other without necessarily involving a fixed network infrastructure device. Ad hoc networks can encompass networks known as peer-to-peer networks or Independent Basic Service Set (IBSS) networks, for example.

The nodes in an ad hoc network rely on sufficient connectivity with each other in order to communicate. A communication in an ad hoc network can travel from one node to another either directly or through some set of intermediate nodes. The connectivity among the nodes can change from time-to-time as the communication devices travel in and out of range of the network.

Because an ad hoc network can incorporate mobile communication devices, its nodes tend to operate on lower transmit power to conserve battery resources. The limited transmit power can affect the capability of the ad hoc network to reach other devices. An ad-hoc network thus typically includes a small group of devices all in very close proximity to each other.

In addition, a path for routing communications in an ad hoc network can change dynamically because the nodes can be mobile and thus the network topology may change frequently. While ad hoc networks are likely to become a highly used means of communication in connection with multimedia, it is anticipated that problems will occur due to node mobility and battery resource limitations.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
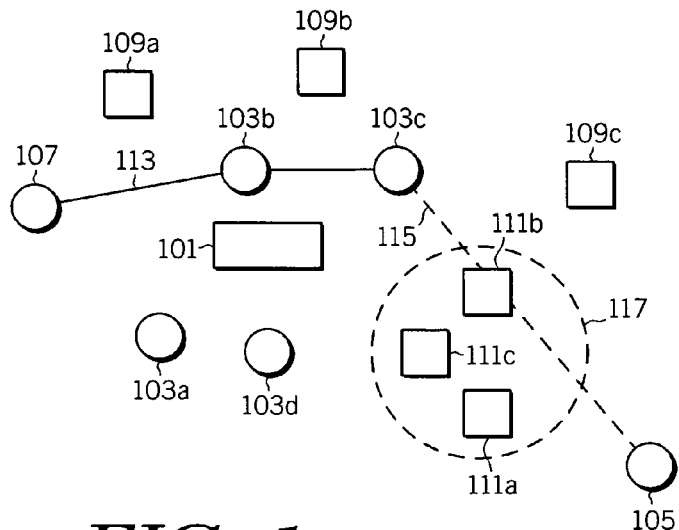
FIG. 1 is a diagram illustrating a simplified and representative ad hoc network environment associated with exemplary nodes in accordance with various exemplary embodiments.

In overview, the present disclosure concerns wireless communications devices or units, often referred to as communication units, such as cellular telephones, two-way radios, laptop computers, and the like having a capability to communicate with each other in a wireless manner, such as mobile wireless devices associated with an ad hoc communication network, e.g., that support IEEE 802.11, Bluetooth, or the like. Such communication devices and networks may further provide services such as voice and data communications services. More particularly, various inventive concepts and principles are embodied in systems, communication units, and methods therein for coordinating nodes in an ad hoc communication network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to accommodate battery resource limitations and mobility generally presented in connection with ad hoc networks. Conventional ad hoc networking consumes the battery life of an idle node which is not using ad hoc capabilities; idle nodes bear the burden of being ready to perform relays for active nodes and/or to become active destination nodes, even if never requested to become a destination or a part of a relay. This is because each node must have a receiver to listen to data packets and determine whether it is being addressed, at least during an initial setup. Battery life can be preserved by allowing nodes that do not need to be active to go into a dormant state and only awaken periodically to listen for new messages. However, if an idle node is in a dormant state, it can introduce a problem in some situations, such as during congestion or if there is a highly mobile node.

Further in accordance with exemplary embodiments, there is provided a system and method for enabling active nodes to solicit relay assistance from idle nodes, whereas otherwise the idle nodes can sleep to conserve battery resource. A cluster head can be utilized to coordinate nodes within its coverage area. For example, a cluster head can manage idle nodes and active nodes on different carriers, so that idle nodes operate on one carrier reserved for control traffic, and active nodes operate on a different carrier reserved for data traffic. Optionally, a cluster head can extend a coverage area utilizing relays with a distributed synchronization.

The nodes can be synchronized, for example to a time division multiplex (TDM) schedule distributed by the cluster head. An idle node can sleep while in a low duty cycle, awakening at scheduled times determined by the cluster head in order to perform various functions, e.g., to acquire information about neighbor nodes, to receive information from the cluster head, etc.

An active node can request that the cluster head awaken an idle node, e.g., for use in a relay. In response to such a request, a cluster head can determine an appropriate idle node to be utilized as an active node relay, and can cause the idle node to become an active node, thereby facilitating continued data communications.

Referring now to FIG. 1, a diagram illustrating a simplified and representative ad hoc network environment associated with exemplary nodes in accordance with various exemplary embodiments will be discussed and described. In this example, the ad hoc network includes an active node 105 that is a source of a communication and an active node 107 that is a destination of the communication. The ad hoc network also includes other active nodes, here represented by active nodes 103a-103d. In addition, the ad hoc network includes idle nodes 109a-109c as well as a particular set 117 of idle nodes 111a-111c (described in more detail below). A cluster head 101 is also available. In the present example, the cluster head 101 is in range of the active nodes 103a-d, 105, 107, and the idle nodes 109a-c, and 111a-c, and can receive/transmit wireless communication from/to any of the nodes.

Communications between the source active node 105 and the destination active node 107 in the present example are transferred between active nodes 103b, 103c which function as relays in the communication link 113. (Communications, including, e.g., communication routes, relays, and packet addressing, can be established in accordance with known techniques and protocols for communicating between nodes in an ad hoc network.) In the illustrated example, communications on a communication link between the source active node 105 and the destination active node 107 have been interrupted. For example, perhaps the source active node 105 is mobile and moved out of range of communication with relay node 103c. A relay can be established between the source active node 105 to complete a communication link 115 to existing relay node 103c.

The cluster head 101 has certain information representative of the active and idle nodes in the cluster head's range. The source active node 105 can inform the cluster head 101 that it needs a relay, e.g., in order to form or maintain a communication link, whereupon the cluster head 101 can determine one or more of the nodes that are appropriate for use as relays for the source active node 105. (Route determination and relay determination can be performed based on the information, in accordance with known techniques, to determine which of numerous possible paths to utilize. Thereby, the cluster head 101 can determine which of the idle nodes can be used for relays for the source active node 105.) In this case, the cluster head 101 determines that one or more idle nodes in the set 117 of idle nodes 111a-c are appropriate, as described herein later, perhaps due to a range of the source active node 105. The cluster head can select one or more of idle nodes 111a-c in the set 117 and instruct it to become active, at which time the communication link 115 can be established, thereby completing the communication link 113 to the destination active node 107. Alternatively, node 105 may currently have a communication link with node 103c. The quality of the link may be degrading due to the movement of either node 105 or 103c. In this case, the cluster head 101 can determine that one or more idle nodes in the set 117 of idle nodes 111a-c are appropriate to maintain the communications with node 107.

Communication links 113, 115 can be established in accordance with known techniques, whereby two devices can communicate with each other utilizing, e.g., a MAC (media access control) address or a DLC (data link control). The MAC address or DLC address is a hardware address that uniquely identifies each node of a network, in networks that conform to the IEEE 802 standards or the OSI (Open System Interface) Reference Model standards, respectively.

In addition, the cluster head 101 can synchronize and coordinate registrations of the idle nodes, to enable efficient collection and reporting to the cluster head by nodes of information they collect on their neighboring nodes. The cluster head can select and coordinate awake times of particular nodes, which may be utilized in connection with various routes, utilizing the collected information. Moreover, optionally, a node can relay information to the cluster head 101 regarding nodes that are not only in the cluster head's coverage area, but also out of the coverage area, by synchronized exchanges of information.

The cluster head 101 optionally can manage idle and active nodes on different channels, in order to reduce channel contention. The cluster head 101 can be a node or a network infrastructure device, and can have a transceiver suitable for ad hoc networking, e.g., supporting IEEE 802.11.

More particularly, in an FDMA network, the nodes can operate on a radio frequency (RF) carrier specifically reserved for control data between the cluster head 101 and the idle nodes 109a-c, 111a-c in the coverage area of the cluster head 101. It can be advantageous for the cluster head 101 to not carry any user data traffic and only carry control data. The transceiver of the cluster head 101 can be utilized to switch between control data carrier for idle nodes and a separate RF carrier designated for use by active nodes for exchanging control data and user data during active data sessions. The active node channel and the idle node channel essentially act as different networks. In operation, it is anticipated that the cluster head 101 can spend a significant portion of time actively listening to the RF carriers to facilitate a request from idle nodes and/or active nodes. The cluster head 101 can determine a schedule to synchronize between active nodes and idle nodes, e.g., utilizing time division multiple access (TDMA).

Figure 2:
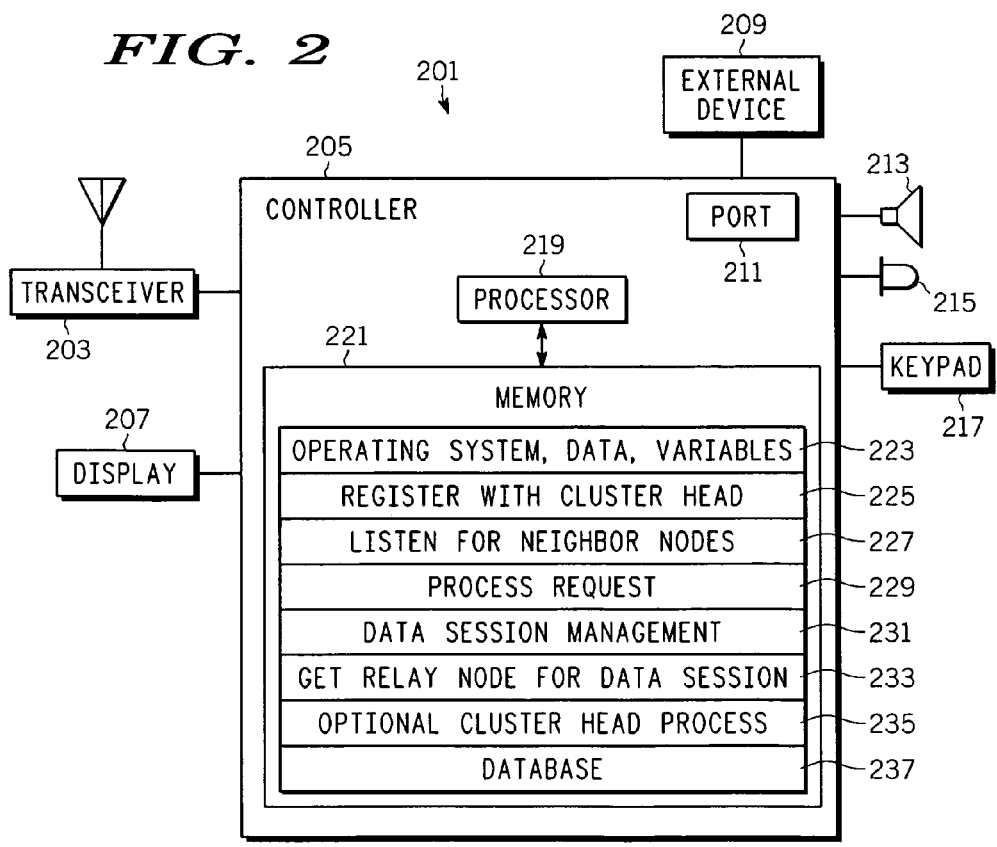
FIG. 2 is a block diagram illustrating portions of an exemplary communication unit in accordance with various exemplary embodiments.

Referring now to FIG. 2, a block diagram illustrating portions of an exemplary communication unit in accordance with various exemplary embodiments will be discussed and described. Although a communication unit 201 is depicted and discussed in the present example, it will be appreciated that one or more embodiments can be operated in connection with processors utilized in connection with other types of devices not limited to the communication industry. The communication unit 201 may include one or more controllers 205, a transceiver 203, and an optional communication port 211 for communication with an optional external device 209. The controller 205 as depicted generally includes a processor 219, and a memory 221, and may include other functionality not illustrated for the sake of simplicity. The communication unit 201 may further include, e.g., a speaker 213, a microphone 215, a text and/or image display 207, an alerting device (not illustrated) for providing vibratory alert, visual alert, or other alert, and/or a user input device such as a keypad 217. The transceiver 203 can be capable of receiving communications when operably connected to a communication network, and in one or more embodiments the transceiver comprises one or more separate transmitters and receivers.

The processor 219 may comprise one or more microprocessors and/or one or more digital signal processors. The memory 221 may be coupled to the processor 219 and may comprise a read-only memory (ROM), a random-access memory (RAM), a programmable ROM (PROM), and/or an electrically erasable read-only memory (EEPROM), etc. The memory 221 may include multiple memory locations for storing, among other things, an operating system, data and variables 223 for programs executed by the processor 219; computer programs for causing the processor 219 to operate in connection with various functions such as registering with the cluster head 225, listening for neighbor nodes 227, processing requests 229, data session management 231, getting a relay node for a data session 233, optional cluster head processing 235, and/or other processing (not illustrated); a database 237 of various information, e.g., identifications of neighbor nodes and collected information corresponding thereto; and a database (not illustrated) for other information used by the processor 219. The computer programs may be stored, for example, in ROM, PROM, or the like and may direct the processor 219 in controlling the operation of the communication device 201.

The display 207 may present information to a user by way of a conventional liquid crystal display (LCD) or other visual display, and/or by way of a conventional audible device (e.g., the speaker 213) for playing out audible messages.

The user may invoke functions accessible through the user input device 217. The user input device 217 may comprise one or more of various known input devices, such as a keypad as illustrated, a computer mouse, a touchpad, a touch screen, a trackball, and/or a keyboard. Responsive to signaling from the user input device 217, or in accordance with instructions stored in memory 221, the processor 219 may direct or manage stored information or transmit and/or receive information. For example, in response to power up, the processor 219 (cooperatively with the transceiver 203) can be programmed to initialize itself on the network, including, e.g., registering with a cluster head. It will be appreciated that many of the functions herein attributed to the processor are performed by the processor in cooperation with the transceiver, however for simplicity only the processor or controller is mentioned.

A processor 219 can include functions directed to supporting an idle node, e.g., to register with the cluster head 225, to listen for neighbor nodes 227, and to process requests 229. Further, a processor 219 can include functions directed to supporting an active node, e.g., for data session management 231 and to get a relay node for a data session 233. Optionally, the processor can include cluster head process functionality 235. In accordance with one or more alternative embodiments, the processor can omit idle node functionality and active node functionality while supporting cluster head functionality. The following section provides, in connection with FIG. 2, a general overview of the above-mentioned functions. Additional detailed examples are illustrated in connection with FIG. 3-FIG. 6.

As an idle node, the processor 219 can provide a method and/or device for coordinating nodes in an ad hoc communication network, wherein the network includes the node and at least one neighbor, and the method is performed in the node. An idle node that is coordinating with other nodes includes synchronizing a sleep (e.g., dormant) period and an awake period. The sleep period and the awake period can be specified in a schedule. The processor can provide for sleeping in a low duty cycle, including powering down the receiver so as to not receive communications from other nodes or the cluster head. While sleeping, the node can also select one or more other functions of the communication unit, e.g., processes related to networking, and power them down in order to conserve battery power.

The processor 219 of a node functioning as an idle node can register with the cluster head 225. Two types of registering are envisioned, including an initial registering (e.g., to initialize the cluster head's information and to provide information that generally does not change) and a re-registering (e.g., to provide information that can change). (Both initial registering and re-registering are referred to herein as "registering," although a distinction between the two can be explicit or implicit from the context.) The idle node can awaken, responsive to the schedule. Upon awakening, the idle node can register with the cluster head. Registering with the cluster head can include transferring information from the idle node to the cluster head, and receiving information from the cluster head. Information that can be transferred to the cluster head includes, e.g., information on the idle node's own battery state (e.g., power level and/or battery information), the idle node's location, the idle node's identification information, and/or information representative of neighbor nodes (and information therefore) on neighbor nodes acquired by the idle node (as explained below).

Also, when awakened, the idle node can listen for neighbor nodes 227. Accordingly, the idle node can awaken, responsive to a schedule, and listen for one or more neighbor(s). The information obtained while listening is stored, and can later be provided to the cluster head. In accordance with one or more embodiments, the neighbor node(s) that the idle node listens to can be active and/or idle.

The idle node can process requests 229 received via the transceiver, e.g., requests from the cluster head and/or requests received from another node. Accordingly, when awakened, the idle node can listen for one or more requests from the cluster head or at least one neighbor that is active. The request may cause the idle node to become active, and to perform active node functions. Accordingly, responsive to the at least one request, the node can become active, and thereby is available to become involved in one or more communication links. In accordance with one or more embodiments, the communication link can be a designated RF carrier containing the neighbor(s) that is active, wherein the neighbor(s) is in search of a relay node.

As an active node, the processor 219 can provide a device and/or method for coordinating nodes in an ad hoc communication network, wherein the network includes multiple nodes including a particular active node and at least one other active node. The processor 219 can provide for data session management 231. Data session management includes running a data session in connection with at least one other active node. A data session (e.g., transmitting and/or receiving communications) can be operated in accordance with conventional protocols concerning data sessions in ad hoc networks and routing of data between nodes. Optionally, the data session can occur on a specific data channel.

Further, as an active node, the processor 219 can provide for identifying and engaging a relay node for a data session 233, in appropriate circumstances. For example, during the data session, and responsive to congestion or degradation, the processor 219 can provide for checking for at least one other node of the plurality of nodes, wherein the at least one other node is available and active; and if no other active node is available, the processor 219 can provide for transmitting a request to a cluster head to wake up at least one idle node. Congestion or degradation can be defined as is appropriate, including optionally anticipating congestion or degradation as explained in more detail below. A node can be determined to be available and active, for example, if it responds in a timely manner to attempts to communicate therewith.

The processor 219 optionally can be provided in a node or in a fixed network structure having cluster head processing 235. As a cluster head, the processor 219 can provide a method for coordinating nodes in an ad hoc communication network. The processor 219 can support managing multiple nodes including one or more active nodes and one or more idle nodes. Managing nodes can include, for example, tracking nodes that are available in the ad hoc network, tracking node characteristics (e.g., active/idle, battery status, and/or identification, etc.), designating communication channels for active/idle nodes, and/or conventional node management techniques, discussion of which is omitted for simplicity. The processor 219 can provide for listening to nodes 227 to facilitate a request from one or more idle nodes or one or more active nodes. Also, the processor can determine a synchronization of the nodes including the one or more idle nodes, and can determine a schedule for waking corresponding to the one or more idle nodes and responsive to the synchronization. Further, in response to a registration request from the idle node(s), the cluster head processor can transmit the schedule to the idle node(s).

Figure 3:
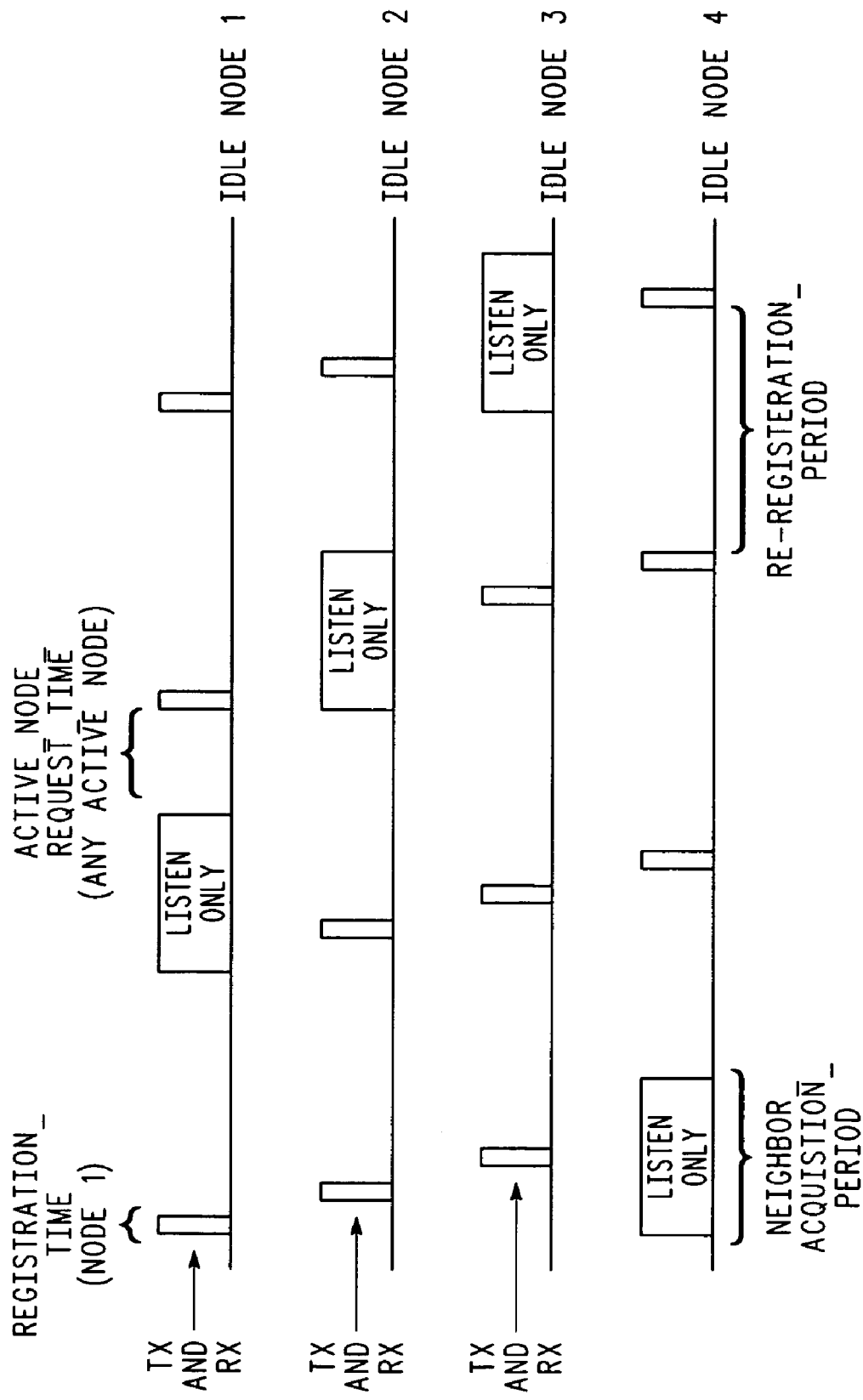
FIG. 3 is a timing diagram illustrating a communication time line of several idle nodes in accordance with various exemplary embodiments.

Referring now to FIG. 3, a timing diagram illustrating a communication time line of several idle nodes in accordance with various exemplary embodiments will be discussed and described. In this example, the idle nodes include idle nodes 1-4.

Initially, such as in response to a power up condition, an idle node, e.g., idle node 1, registers with a cluster head in its coverage area. A registration can include a transmission of information to the cluster head and/or a receipt of information from the cluster head. The information sent to the cluster head can include, e.g., an IP address of the node as well as other useful information such as battery capacity. The cluster head can transmit information to the node such as a schedule of when the node can wake up to register with the cluster head (e.g. re-registration period every 5 seconds). In addition, the cluster head can inform the node of a schedule when the node (if idle) can become awake to listen to registrations or other communications of other nodes in proximity (referred to as "neighbor acquisition" or "listen only").

During neighbor acquisition, the node can acquire information regarding its neighbor nodes by listening for neighbor nodes, where a neighbor node is in proximity to the node so as be able to communicate therewith. Neighbor acquisition time can be periodic (e.g. 2 second neighbor acquisition time with a NEIGHBOR_ACQUISITION_PERIOD (see FIG. 3)) every 15 seconds). Advantageously, the neighbor acquisition time can be an integer multiple of the re-registration period because potentially new information is gathered during the re-registration period. During neighbor acquisition, a receiver of the node is active and can receive communications broadcast from other nodes that are in range. Accordingly, information that is included in communications from neighbor nodes can be detected by the node. During the neighbor acquisition, it is possible that a neighbor outside the coverage area of the cluster head may attempt to register with the cluster head. The idle node can forward this registration on to the cluster head during its next re-registration.

During re-registration, an idle node can inform the cluster head of information it has collected about its neighbor nodes. Also during re-registration, the cluster head can inform the idle node(s) of the addresses of the node's neighbors, for potential future use, e.g., as IP (internet protocol) addresses, for speeding up the route discovery process in the event that the idle node becomes active in a call. Advantageously, the cluster head can use re-registration to request that the idle node become active, as will be discussed later. Additionally, the cluster head may use the re-registration period to inform an idle node that it must rebroadcast its sleep schedule to neighboring nodes that are outside of the coverage area of the cluster head.

Initial registration can occur at a random, unsynchronized time. Further, many attempts at initial registration can occur before the cluster head hears the registration request.

Re-registrations can advantageously be scheduled consecutively in time with small gaps reserved for initial registrations. Since initial registration and re-registration can consume a small amount of time (e.g. 5 msec for REGISTRATION_TIME illustrated in FIG. 3) relative to the re-registration period (e.g., 5 seconds for the REGISTRATION_PERIOD illustrated in FIG. 3), the remaining idle time, e.g., on the idle node control channel, after the scheduled re-registrations can be used by the cluster head to listen to requests from the active nodes, e.g., on the RF carrier designated for active node control and user data traffic. The cluster head can send information to an idle node during registration of idle time on the schedule that remains after the re-registrations, so that if the idle node becomes active, it has a particular time when it can make a request of the cluster head, e.g., for relay assistance from other idle nodes (ACTIVE_NODE_REQUEST_TIME illustrated in FIG. 3).

An idle node can sleep according to the schedule provided by the cluster head. Sleeping can include, e.g., powering down at least the receiver except during the neighbor acquisition period. When an idle node awakes, it can listen for one or more requests from the cluster head, e.g., requesting that the idle node become active. A node that is requested to become active can suspend its sleep schedule, e.g., for a predetermined "suspend period" and can power up its receiver or transceiver, e.g., by switching its transceiver to the RF channel designated for active nodes. If the node does not become utilized during the "suspend period", e.g., by becoming involved as a node (destination or relay) in a communication relay, the node can revert to being an idle node, including, e.g., reverting back to the RF carrier designated for idle nodes and can resume sleeping according to the schedule. The cluster head advantageously can avoid reassigning the registration time corresponding to the idle node to another node before the "suspend period" is completed.

The cluster head can manage a list of nodes, including idle nodes, and information corresponding thereto. Upon a request from an active node, the cluster head can select one or more idle nodes to awaken, based on information corresponding thereto which the cluster head collected, e.g., during registration (such as battery capacity, location, etc.), and can provide one or more active nodes with an identity of one or more idle nodes to support an existing data communication session. A cluster head can designate an idle node that repeatedly does not re-register as either active or no longer in the coverage area of the cluster head.

An active node can operate autonomously from the cluster head, until it determines that relay assistance is needed from one or more idle nodes in the cluster head coverage area. For example, in the event that an active node determines that it is congested and has become a bottleneck for incoming user data traffic, the active node can transmit a request to the cluster head to wake/activate one or more idle nodes, thereby allowing alternative routes to be created around the congested node. The request to activate idle nodes can advantageously occur during the ACTIVE_NODE_REQUEST_TIME (shown in FIG. 3), to take advantage of the idle nodes being inactive so the cluster head is now available to listen to active nodes making requests. Alternatively, if it is not possible to communicate directly with the cluster head and therefore relaying is required, the ACTIVE_NODE_REQUEST_TIME can be extended into the re-registration period thus providing additional time to enable other nodes to route the request for activating idle nodes.

As another example, an active node that is moving quickly through a cluster head coverage area may request the cluster head to activate nodes during the ACTIVE_NODE_REQUEST_TIME to facilitate routing through the cluster head coverage area. Since the cluster head can contain information such as the IP addresses corresponding to idle nodes in its coverage area, such information can be provided to an active node making an activation request, in order to reduce a time to set up a path.

The cluster head can determine which idle nodes to wake up in various ways. For example, since an idle node can use the neighbor acquisition time to listen for neighbor nodes, the idle node is capable of listening for both active and idle neighbors. Accordingly, the idle node can periodically use its neighbor acquisition time to change channels to listen to neighbors on the active node channel. Information that can be acquired during the neighbor acquisition time includes an IP address, MAC address, and/or other identifier or information corresponding to the neighbor node and included in communications. The information collected by the idle node can be provided by the idle node to the cluster head during registration so that the cluster head can itself have information regarding neighbors (or neighbors to the neighbor) of nodes, as well as information reflecting which nodes are in range of each other. Such information can be useful, for example, when one or more nodes requests assistance. According to one or more alternative embodiments, a node can be equipped with a GPS (global positioning system) or other location estimation technique to provide location information to the cluster head during registration. In addition, adjacent cluster heads may also share information to facilitate transfers between coverage areas of different cluster heads, e.g., by relaying information via proximate nodes.

The node can determine that it needs help from the cluster head, e.g., when experiencing high mobility, in various ways. For example, a trigger can be based on a conventional rate adaptation method in use by the node. As another example, using known auto rate fallback (ARF) techniques, a determination that a data rate is being decreased in a communication with the active node's next node in a communication link can trigger a request to the cluster head to activate one or more idle nodes, in order to maintain a route to the destination node.

In an ad hoc network where no cluster head exists, nodes that enter the network can attempt to register with a cluster head, e.g., on the idle node channel, e.g., the designated control RF carrier. Upon receiving no registration response, the idle node can switch to the active node channel, e.g., the RF carrier designated for active node control and user data traffic, thereby operating with the conventional mode of ad hoc networking.

Figure 4:
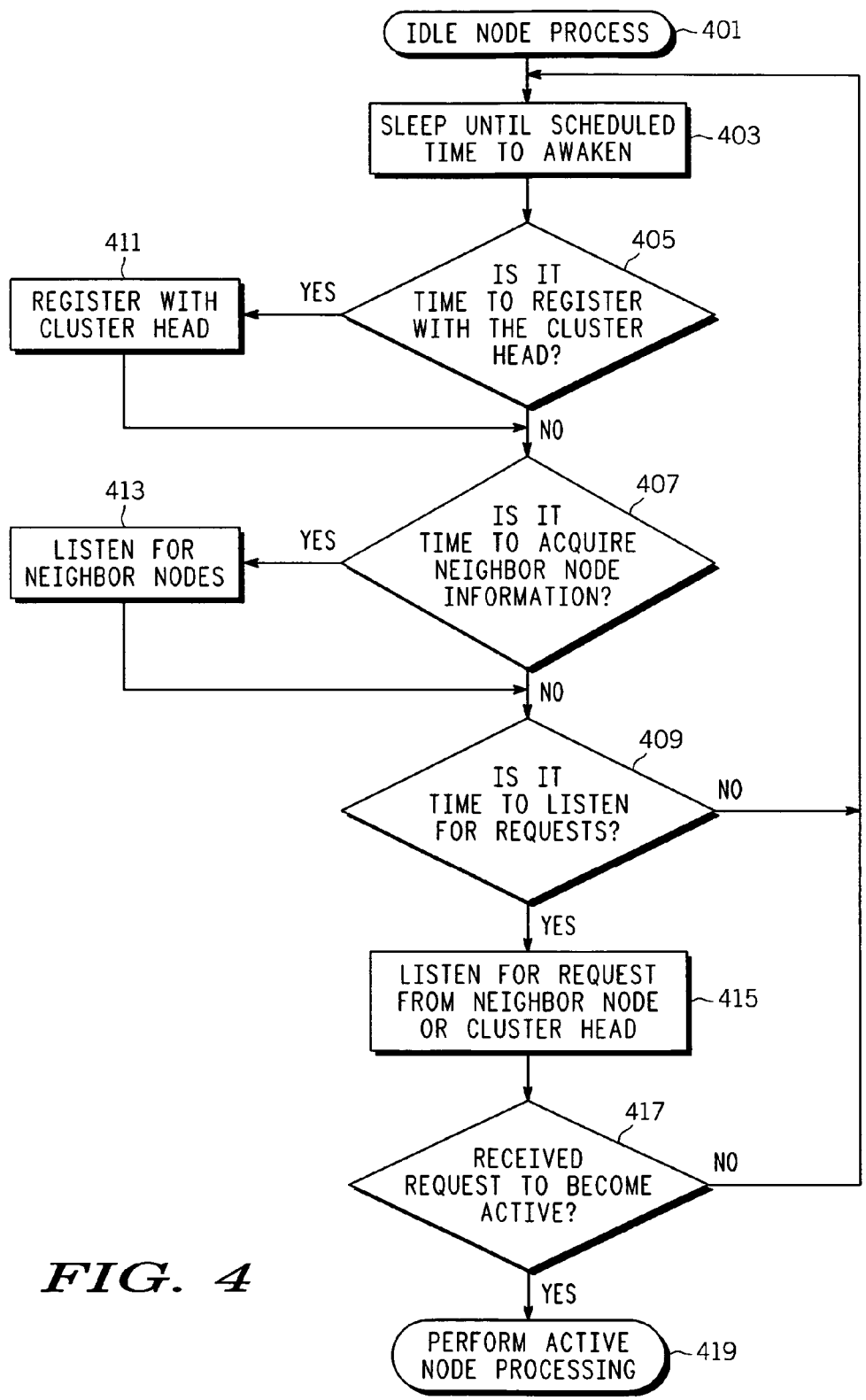
FIG. 4 is a flow chart illustrating an exemplary idle node process in accordance with various exemplary embodiments.
Figure 5:
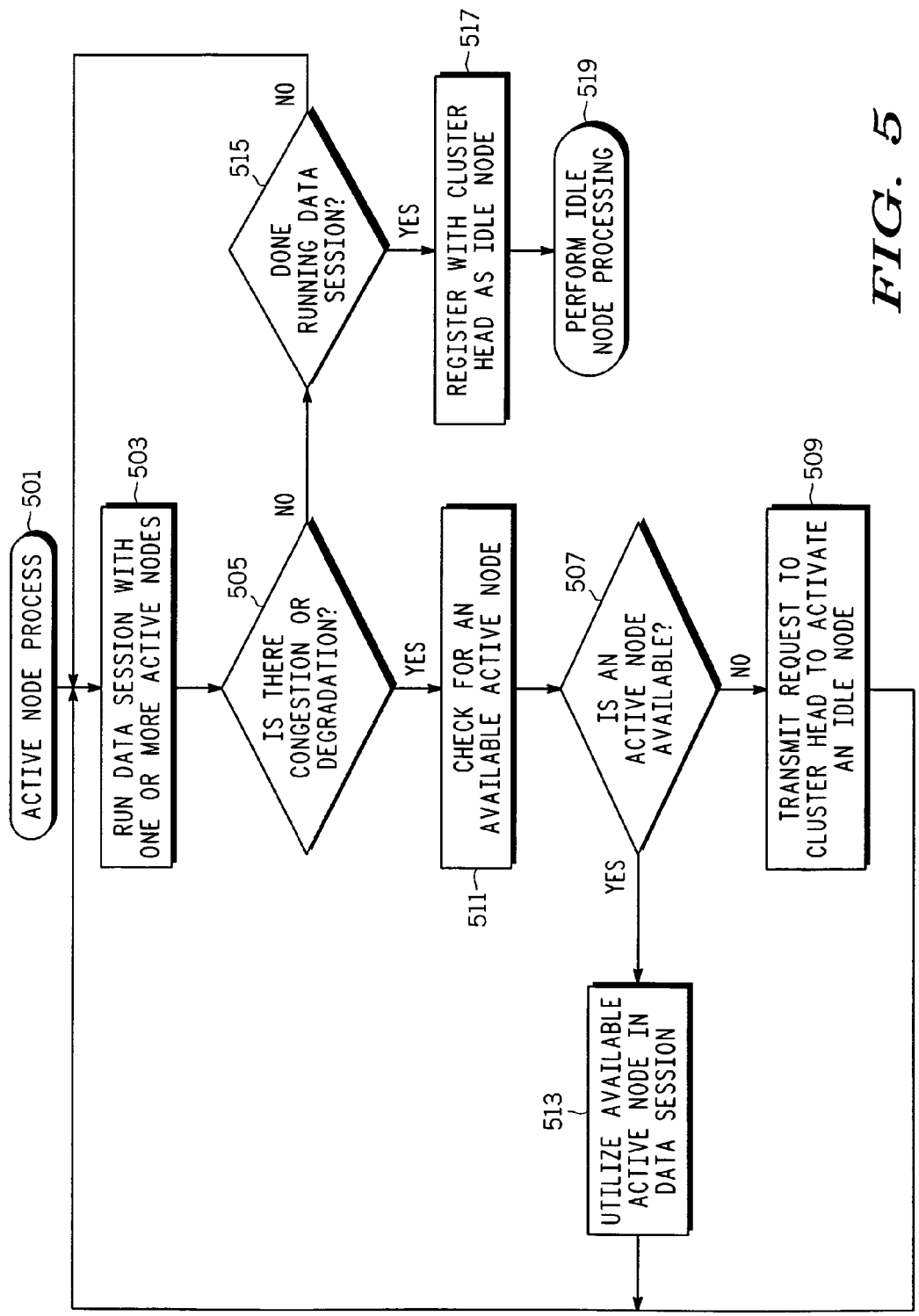
FIG. 5 is a flow chart illustrating an exemplary active node process in accordance with various exemplary embodiments.
Figure 6:
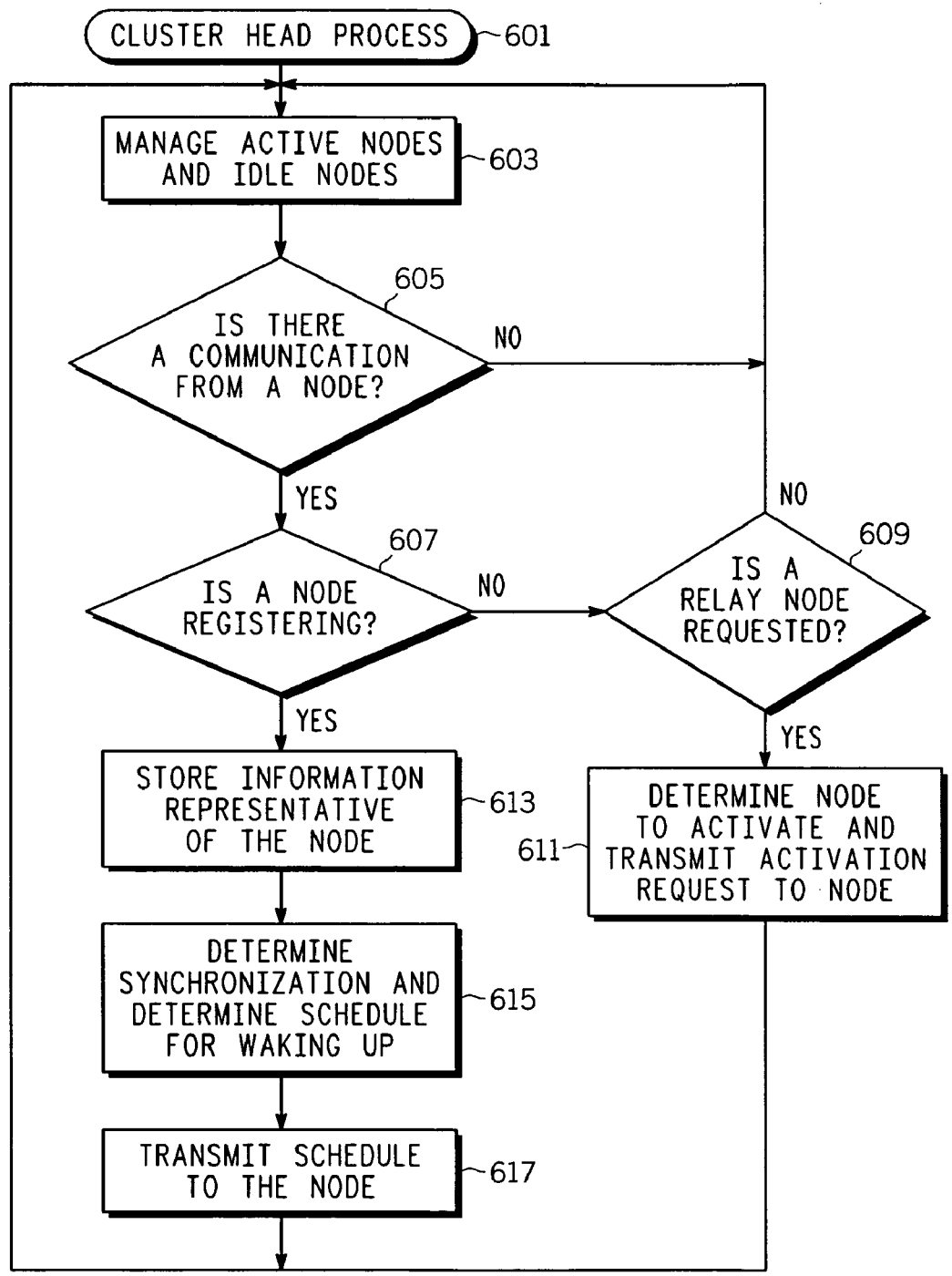
FIG. 6 is a flow chart illustrating a cluster head process in accordance with various exemplary embodiments.

FIG. 4, FIG. 5 and FIG. 6 provide exemplary flow charts for an illustrative idle node process, an illustrative active node process, and an illustrative cluster head process, respectively. As described herein, a node can switch between being an idle node (e.g., executing an idle node process) and being an active node (e.g., executing an active node process). In addition, a node can optionally perform the function of a cluster head, although in certain networks it may be desirable to have the cluster head function performed on fixed network equipment. The node functioning as a cluster head may, if desired, also include the idle node/active node process. Each of these illustrative processes is described in more detail below.

Referring now to FIG. 4, a flow chart illustrating an exemplary idle node process 401 in accordance with various exemplary embodiments will be discussed and described. The process can advantageously be implemented on, for example, a processor of a node, described in connection with FIG. 2 or other apparatus appropriately arranged. The idle node process 401 can optionally include broadcasting a registration to the cluster head, responsive to a power-up or other initiation of a node, and receiving, e.g., a schedule including a time to awaken and any other schedule information.

The process can provide for sleeping 403 until the scheduled time to awaken. In response to the schedule, the process can check whether it is time 405 to register with the cluster head, time 407 to acquire neighbor node information, and/or time 409 to listen for requests.

If it is time 405 to register with the cluster head, the process can provide for registering 411 with the cluster head. Registering can include, among other things, receiving the schedule from the cluster head. In accordance with one or more embodiments, the schedule includes an indication of a frequency of wakening and a duration of the listening for neighbor nodes. Further, the node can provide information (described further herein) to the cluster head while registering.

If it is time 407 to acquire neighbor node information, the process can provide for listening 413 for neighbor nodes. While listening for neighbor nodes, the process can provide for acquiring a variety of information that can be observed while the neighbor nodes communicate with any other node and/or the cluster head. Accordingly, the process can provide for collecting information representative of one or more neighbor nodes, while listening. Information that is collected can include, for example, a MAC address or other information to identify the neighbor node, battery life information, and/or device type information, and the like.

The collected information can be provided to the cluster head, for example during the registration process previously described. Optionally, during the registering, the process can provide for receiving data having an indication of one or more neighbors from the cluster head during the registering process. This information can be used to discover one or more communication routes.

If it is time 409 to listen for requests, the process can provide for listening 415 for one or more requests from neighbor nodes and/or the cluster head. Requests can include, for example, a request that the idle node become active. If the received request is a request to become active, then the process can include performing active node processing 419. Active node processing is described in more detail in connection with, e.g., FIG. 5. If the received request was not to become active, or otherwise if it is not time to register, acquire neighbor node information, or listen for requests, the process can loop to sleep 403 until the scheduled time to awaken. In order to accomplish sleeping, the process can provide for powering down a receiver on the node, except during one or more various periods of listening.

Optionally, the process can provide for extending the coverage of the cluster head, where the process locates one or more nodes outside the cluster head coverage area, from nodes that are at a periphery of the cluster head coverage area, e.g., nodes that have failed registration with the cluster head (such as due to inadequate range). For example, a request may also come from at least one other idle neighbor that is out of the coverage area of the cluster head. The neighboring idle node may request that its registration request be forwarded on to the cluster head. Conversely, the process can provide for transmitting the schedule to at least one other neighbor to extend a coverage area of the cluster head. In this instance, the neighbor can be a member of another ad hoc network, but can have a range that overlaps the present ad hoc network. The neighbor node can therefore be a member of two or more ad hoc networks, and can utilize the schedules of one or more of the networks of which it is a member.

Advantageously, the process can be performed in a communication device.

Referring now to FIG. 5, a flow chart illustrating an exemplary active node process 501 in accordance with various exemplary embodiments will be discussed and described. The process can advantageously be implemented on, for example, a processor of a node, described in connection with FIG. 2 or other apparatus appropriately arranged. The active node process 501 can include, for example, running 503 a data session with one or more active nodes.

If the process notes that there is congestion or degradation 505, the process can check 511 for an active available node. For example, the process can check an internal list it can maintain of active nodes, or can broadcast a message to determine if there is an available active node in range using known route discovery protocols.

If an active node 507 is available, the process can utilize 513 the active node in the data session, e.g., by utilizing the active node as a relay in the data session.

If no active node 507 is available, the process can transmit 509 a request to the cluster head to activate an idle node. Upon receipt of the request, the cluster head can select one or more idle nodes to activate. When the idle node(s) become active, the active node process can communicate with the newly active node(s) using known route discovery protocols. Alternatively, the cluster head can provide the active node with a list of idle nodes that it will awaken. The active node can then communicate directly with the idle nodes using address information provided by the cluster head. The process hence can utilize the new relay in the data session.

If there was no congestion or degradation 505, and hence no need for an additional active node, the active node process can check 515 whether it is done running the data session. If it is done running the data session, the process can register 517 with the cluster head as an idle node. Alternatively, the cluster head can note that the process is in an idle state because it re-registers with the cluster head during the appropriate scheduled time for idle nodes. Then, the process can perform 519 idle node processing, described in more detail for example in connection with FIG. 4. If the process is not done running the data session 515, the process loops to continue to run the data session 503 with one or more active nodes.

Idle node processing 519 can include, as described in more detail previously, receiving a schedule from a cluster head; responsive to a low duty cycle, sleeping; and, responsive to the schedule, awakening and registering with the cluster head, listening for one or more nodes, and/or listening for request(s) from the active node(s) and/or the cluster head.

Referring now to FIG. 6, a flow chart illustrating a cluster head process 601 in accordance with various exemplary embodiments will be discussed and described. The process can advantageously be implemented on, for example, a processor of a node described in connection with FIG. 2, a processor of a controller on fixed network equipment, or other apparatus appropriately arranged.

The cluster head process 601 can include managing 603 active nodes and idle nodes, as previously described. The cluster head process can check for various communications received from a node. If there is no communication 605 received from a node, the process can loop to continue to manage 603 active nodes and idle nodes.

On the other hand, if there is a communication 605 from a node, the process can check whether a node 607 is registering. If a node is registering, the process will store 613 information related to the node, e.g., information on the idle node's own battery state (e.g., power level and/or battery information), the idle node's location, the idle node's identification information, and/or information representative of neighbor nodes (and information therefore) on neighbor nodes acquired by the idle node. Then the process can determine 615 synchronization and can determine the schedule for waking up the node that is registering. The cluster head has information on several idle nodes, and can arrange a time schedule with opportunities for each idle node to remain idle and to register, for example, five seconds of idle time with 5 msec for registration. The schedule can include an awakening time. The process can include determining the awakening time corresponding to the idle node(s), responsive to the multiple nodes. One or more embodiments provide that the schedule can be determined according to a TDMA (time division multiple access) schedule.

For example, the process can include determining information representative of the nodes in a region that are relevant to the idle node, and transmitting the information to the idle node, responsive to receipt of the registration request. The schedule 617 in addition can be transmitted to the node.

If the communication from the node is 609 a relay node request, then the process can determine 611 a node to be activated, and can transmit an activation request to the node. More specifically, the process can provide for, responsive to a request for a relay node, transmitting a request to the idle node(s) to become active. Moreover, the process can include determining the idle node(s) that is to become active. An appropriate standard for determining an idle node that is to become active can include determining the available battery power, so as to avoid depleting nodes with lower battery power. The process can loop to continue to manage 603 active nodes and idle nodes.

Optionally, while the node is registering, the process can include obtaining information the node collected on its neighbor nodes. Accordingly, the process can include receiving information representative of one or more nodes from the idle node, responsive to the schedule for the idle node.

In accordance with one or more embodiments, the process is performed in an access point, such as a fixed network infrastructure device. Alternatively, the process can be performed in one or more nodes.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation in different networks.

While the above description discusses an FDMA system such as IEEE 802.11, one or more alternative embodiments can be utilized in connection with a TDMA system whereby logical channels are used to independently contain the idle nodes and their control data traffic, and the active nodes and their respective control and user data traffic.

The above description optionally provides a solution for an ad hoc network that has a sufficient number of cluster heads to provide overlapping coverage for idle and active nodes. In the event that cluster heads do not provide overlapping coverage, a multi-hop relaying attribute of ad hoc networking can extend the cluster head coverage. Optionally, the synchronization of an ad hoc network can be extended to other ad hoc networks through the idle nodes. A synchronization message can be distributed from idle node to idle node using "chain of communication" from a real-time clock source or other available source with a synchronization message. The synchronization message can be distributed, e.g., during the registration time in the form of a broadcast message from the idle node that has access to the clock source or "chain of communication." The synchronization message can contain the schedule (received from the cluster head) of a next time the particular idle node will awaken. The synchronization message can include a schedule, e.g., a clock quality metric that is a function of clock source accuracy and degradations due to a number of hops from the source, latency since last update from the clock source, and/or local oscillator drift during clock storage, etc. A node that receives multiple synchronization messages can select and relay one message, e.g., the message with the highest clock metric, and can discard others. When a synchronization message with a higher clock metric is received that differs from a current clock, slow adaptation can be used to correct any skew. A clock advance or a retard marker can be used to enable small, incremental clock corrections to allow neighbor nodes to gradually adapt to a new clock source while maintaining synchronization.

Nodes that are out of the cluster head coverage area can thereby perform periodic registrations with idle nodes in the cluster head coverage area. The idle nodes within the cluster head coverage area can thereby become a relay between the cluster head and the out-of-coverage idle node. In the event that an active node requests additional relays, the cluster head can infer from a hop distance from the cluster head which idle nodes should be considered to request for activation as a potential relay.

One or more embodiments can be extended to a fully decentralized architecture without cluster heads, with one or more nodes that volunteer to perform functions of a cluster head.

Accordingly, there have been described, and examples have been provided to illustrate, various inventive principles and combinations thereof to accommodate battery power limitations and mobility generally presented in connection with ad hoc networks. In accordance with the foregoing, an idle node in an ad hoc network can conserve power, because the idle node need not constantly listen to communications to determine whether it is being addressed. Nevertheless, an idle node can be used as an active node on demand, thereby avoiding congestion and other problems that can be associated with mobile ad hoc networks.

The communication systems and communication units of particular interest may be coupled with those providing or facilitating voice communications services or data or messaging services over cellular wide area networks (WANs), such as conventional two way systems and devices, and various cellular phone systems and variants or evolutions thereof.

Furthermore the wireless communication units or devices of interest have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for coordinating nodes in an ad hoc communication network, wherein the network includes a node and at least one neighbor, the method performed in the node and comprising:

sleeping in a low duty cycle as an idle node;

awakening for a wake time, responsive to a schedule, and becoming an active node by registering with a cluster head during each wake time;

listening during each wake time for at least one activation request, the activation request sent from the cluster head responsive to congestion or degradation on a communication link;

responsive to the at least one activation request, remaining awake and becoming active on the communication link as a relay node for data sessions between a source node and a destination node; and absent the at least one activation request, returning to the sleeping in a low duty cycle as an idle node.

2. The method of claim 1, further comprising broadcasting a registration to the cluster head, responsive to a power-up.

3. The method of claim 1, wherein the registering includes receiving a new schedule from the cluster head.

4. The method of claim 1, wherein the schedule includes an indication of a frequency of wakening and a duration of the listening.

5. The method of claim 1, further comprising listening during the wake time for at least one neighbor, wherein the at least one neighbor can be active or idle and collecting information representative of the at least one neighbor and providing the information to the cluster head during the registering.

6. The method of claim 1, further comprising receiving data having an indication of at least one neighbor from the cluster head during the registering.

7. The method of claim 1, further comprising listening during each wake time for at least one request from at least one neighbor that is idle and that is beyond the coverage of the cluster head.

8. The method of claim 1, wherein the communication link is a designated RF carrier supporting at least one neighbor that is active, wherein the at least one neighbor is in search of a relay node.

9. The method of claim 1, further comprising transmitting the schedule to at least one other neighbor to extend a coverage of the cluster head.

10. The method of claim 1, wherein the method is performed in a communication device.

11. A method for coordinating nodes in an ad hoc communication network, wherein the network includes a plurality of nodes including a node and at least one active node, performed in the node, comprising:
    running a data session in connection with at least one active node; and
    during the data session, responsive to congestion or degradation, checking for at least one other node of the plurality of nodes, wherein the at least one other node is available and active; and if no other active node is available, transmitting a request to a cluster head to wake up at least one idle node.

12. The method of claim 11, further comprising utilizing the at least one second relay in the data session.

13. The method of claim 11, further comprising receiving a schedule from a cluster head; responsive to a low duty cycle, sleeping; and, responsive to the schedule, awakening and at least one of registering with the cluster head, first listening for at least one node of the plurality of nodes, and second listening for at least one request from the at least one active node or the cluster head.

14. A method for coordinating nodes in an ad hoc communication network, the method performed in a controller, and comprising:
    managing a plurality of nodes including at least one active node and at least one idle node;
    listening to a network to facilitate a relay request from the at least one active node, the relay request responsive to congestion or degradation of a communication link with the at least one active node; and
    responsive to the relay request from the at least one active node, transmitting an activation request to the at least one idle node so that the idle node, once activated, becomes a relay node for data sessions over the communication link with the at least one active node.

15. The method of claim 14, further comprising first determining a synchronization of the plurality of nodes including the at least one idle node; second determining a schedule for waking corresponding to the at least one idle node and responsive to the synchronization; and receiving information representative of at least one of the plurality of nodes from the at least one idle node, responsive to the schedule for the at least one idle node.

16. The method of claim 15, further comprising determining information representative of the nodes in a region that are relevant to at least one idle node, and transmitting the information to the at least one idle node, responsive to receipt of the registration request.

17. The method of claim 14, wherein the at least one idle node, upon activation, becomes relay node for data sessions over the communication link between a source node and a destination node.

18. The method of claim 17, further comprising determining the at least one idle node that is to become active.

19. The method of claim 15, wherein the schedule includes an awakening time and the method further comprises determining the awakening time corresponding to the at least one idle node, responsive to the synchronization of the plurality of nodes.

20. The method of claim 14, wherein the method is performed in an access point.

* * * * *